United States Patent
Verbil

(10) Patent No.: US 8,614,629 B2
(45) Date of Patent: Dec. 24, 2013

(54) DYNAMIC REPORTING SCHEME FOR LOCATION BASED SERVICES

(75) Inventor: Christopher John Verbil, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/484,186

(22) Filed: May 30, 2012

(65) Prior Publication Data

US 2012/0238290 A1  Sep. 20, 2012

Related U.S. Application Data

(63) Continuation of application No. 12/464,634, filed on May 12, 2009, now Pat. No. 8,199,001.

(51) Int. Cl.
*G08B 21/00* (2006.01)

(52) U.S. Cl.
USPC ...... 340/539.13; 340/988; 701/408; 701/500; 455/456.1

(58) Field of Classification Search
USPC ............. 340/539.13, 988–994; 701/207, 213, 701/408, 500; 455/456.1, 456.3, 404.1, 455/404.2
See application file for complete search history.

(56) References Cited

U.S. PATENT DOCUMENTS

| 8,199,001 B2 | 6/2012 | Verbil | |
|---|---|---|---|
| 2002/0013153 A1* | 1/2002 | Wilcock et al. | ............... 455/456 |
| 2002/0102990 A1 | 8/2002 | Alberth et al. | |
| 2002/0120394 A1 | 8/2002 | Rayne | |
| 2006/0183487 A1 | 8/2006 | Allen et al. | |

FOREIGN PATENT DOCUMENTS

| JP | 2003203243 A | 7/2003 |
|---|---|---|
| JP | 4045476 B2 | 2/2008 |

OTHER PUBLICATIONS

International Search Report and Written Opinion—PCT/US2010/034575, International Search Authority—European Patent Office—Sep. 13, 2010.
Treu, et al., "xtending the LBS-framework TraX: Efficient proximity detection with dead reckoning" Computer Communications, Elsevier Science Publishers BV, Amsterdam, NL LNKDDOI: 10.1016/J.COMCOM.2007.12.013, vol. 31, No. 5, Dec. 25, 2007, pp. 1040-1051, XP022518022.
Taiwan Search Report—TW099115182—TIPO—Apr. 13, 2013.

* cited by examiner

*Primary Examiner* — Jeffery Hofsass
(74) *Attorney, Agent, or Firm* — Howard Seo

(57) ABSTRACT

A dynamic position reporting and/or logging scheme is described herein. Position reporting and/or logging for a mobile device may be dynamically determined based on one or more reporting and/or logging constraints. The constraints may be based on time, distance, events, operating parameters, operating conditions, or some combination thereof. The constraints that dynamically trigger position reporting may be the same as, overlap, or be distinct from the constraints used to trigger position logging. The reporting and logging constraints can be selected to provide a more accurate indication of a track or route traveled by the mobile device.

32 Claims, 5 Drawing Sheets

DYNAMIC REPORTING SCHEME FOR LOCATION BASED SERVICES

CROSS-REFERENCE TO RELATED APPLICATIONS

This application is a continuation of U.S. application Ser. No. 12/464,634 entitled "DYNAMIC REPORTING SCHEME FOR LOCATION BASED SERVICES," filed May 12, 2009 now U.S. Pat. No. 8,199,001, which is hereby incorporated by reference.

BACKGROUND

1. Relevant Field

The field relates generally to wireless position location. In particular, the field relates to a dynamic reporting scheme for position location reporting.

2. Relevant Background

It is not uncommon for wireless devices to include position location capabilities. The wireless device can implement the capabilities to autonomously locate its geographic position. Autonomous position location architecture is typically referred to as mobile-based position location. Alternatively, or additionally, the wireless device can implement the capability to determine its geographic position in conjunction with one or more elements in a wireless network with which the wireless device is in communication. Such augmented position location architecture is typically referred to as mobile-assisted position location.

Regardless of the implementation architecture, the prevalence of position location capable wireless devices permits support for a wide range of Location Based Services (LBS). Location Based Services refers to an application or service that utilizes the position of the wireless device. Examples of Location Based Services include, but are not limited to, location tracking, destination mapping, navigation, traffic avoidance, or some other location aware service. Other examples of Location Based Services include position sensitive advertising.

A Location Based Service may be hosted by the wireless device or a remote entity, and may utilize information including position information that is exchanged between the wireless device and a remote entity. Exchanging information in support of the Location Based Service consumes a portion of the capacity of the wireless channel over which the information is transmitted. The amount of capacity consumed by supporting the Location Based Service is not an issue where the wireless channel is virtually unlimited. However, wireless communication systems are typically capacity constrained and do not offer virtually unlimited capacity to support information transfer. Moreover, the proliferation of position capable wireless devices and the ability of each wireless device to support a vast array of Location Based Services highlights a need to manage information exchange in support of location based services.

The amount of information exchanged in support of Location Based Services needs to balance information bandwidth against consumption of wireless resources. Exchanging detailed information may increase the accuracy and effectiveness of particular Location Based Services at a cost of system resources. Exchanging minimal information potentially sacrifices relevance of the Location Based Services but conserves system resources. Managing information exchange in Location Based Services involves analysis of the information exchange-resource consumption tradeoff.

SUMMARY

A dynamic position reporting and/or logging scheme is described herein. Position reporting and/or logging for a mobile device may be dynamically determined based on one or more reporting and/or logging constraints. The constraints may be based on time, distance, events, operating parameters, operating conditions, or some combination thereof. The constraints that dynamically trigger position reporting may be the same as, overlap, or be distinct from the constraints used to trigger position logging. The reporting and logging constraints can be selected to provide a more accurate indication of a track or route traveled by the mobile device.

Aspects of the invention include a method of dynamic position reporting. The method includes initializing position reporting to a central registry over a wireless communication link, determining a position fix of a mobile station, determining a status of at least one reporting parameter, initiating a position report to the central registry based on the status of the at least one reporting parameter, determining a status of a dynamic reporting parameter, and modifying a value of a threshold for a dependent reporting parameter based on the status of the dynamic reporting parameter.

Aspects of the invention include a method of dynamic position reporting. The method includes initializing position reporting to a central registry over a wireless communication link, initializing a reference value associated with each of a time reporting parameter, a distance reporting parameter, and a course reporting parameter, determining a position fix of a mobile station, determining a status of at least the course reporting parameter, initiating a position report to the central registry based on the status of the course reporting parameter, and resetting the reference value associated with each of the time reporting parameter and the distance reporting parameter based on the status of the course parameter.

Aspects of the invention include dynamic position reporting apparatus. The apparatus includes a position location module configured to determine a position fix of a mobile station, a position data manager coupled to the position location module and configured to initiating a position report based on the status of at least one reporting parameter, determine a status of a dynamic reporting parameter; and modify a value of a threshold for a dependent reporting parameter based on the status of the dynamic reporting parameter, and a communication transceiver coupled to the position data manager and configured to transmit the position report over a wireless channel to a central registry.

Aspects of the invention include dynamic position reporting apparatus. The apparatus includes means determining a position fix of a mobile station, means for determining a status of at least one reporting parameter, means for initiating a position report to a central registry based on the status of the at least one reporting parameter, means for determining a status of a dynamic reporting parameter, means for modifying a value of a threshold for a dependent reporting parameter based on the status of the dynamic reporting parameter, and means for transmitting the position report to the central registry over a wireless communication link

BRIEF DESCRIPTION OF THE DRAWINGS

The features, objects, and advantages of embodiments of the disclosure will become more apparent from the detailed

DETAILED DESCRIPTION

Figure 1:
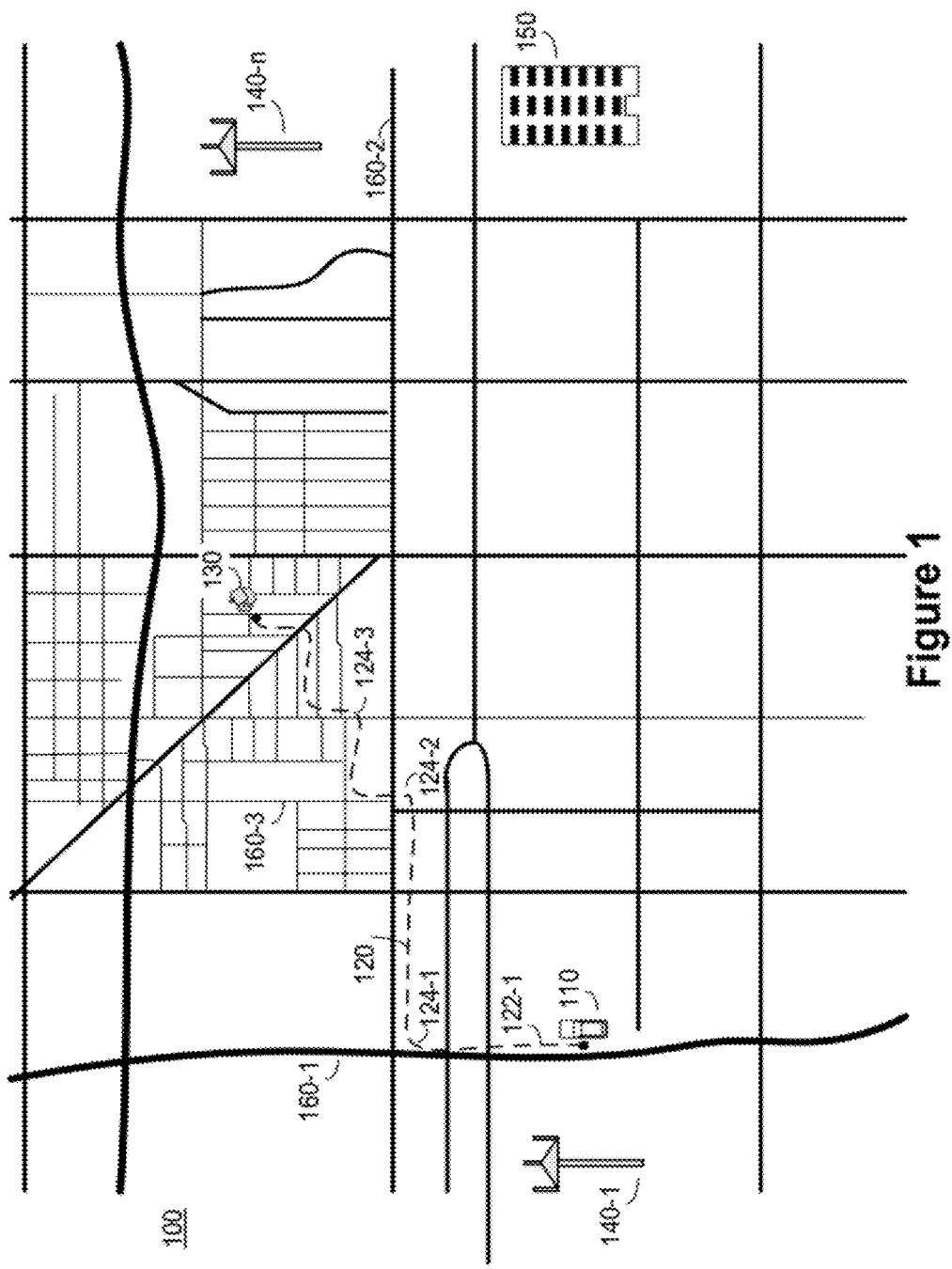
FIG. 1 is a simplified functional diagram of an embodiment of a mobile station in an operating environment.

A mobile station supporting a Location Based Services application can be configured to log position location solutions according to location logging parameters and may report position location solutions according to reporting parameters. The reporting parameters and associated reporting process may be related to or independent of the logging parameters.

The mobile station can be configured to log the position location fixes according to logging parameters that can take in to account, for example, an amount of information to be saved, a prospective estimate of the frequency of updates, and a capacity of available memory. For example, the logging parameters may enable logging every location fix in a mobile device having virtually unlimited available memory.

The mobile station can be configured to report location fixes according to reporting parameters. Typically, the reporting parameters are more restrictive than the logging parameters, such that the mobile station reports fewer location fixes than it logs. The reporting parameters need not be the same for each Location Based Services application. Furthermore, the reporting parameters need not be fixed for any particular Location Based Services application, and can be dynamically varied based on various inputs.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals.

The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above is also considered a "mobile station."

The mobile station may determine its geographic location according to one or more mobile-based or mobile-assisted location techniques. The method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites.

Pseudolites are ground-based transmitters that broadcast a PN code or other ranging code (similar to a GPS or CDMA cellular signal) modulated on an L-band (or other frequency) carrier signal, which may be synchronized with GPS time or some other SPS time reference. Each such transmitter may be assigned a unique PN code so as to permit identification by a remote receiver.

Pseudolites can be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others. The term "SPS signals", as used herein, is intended to include SPS-like signals from pseudolites or equivalents of pseudolites.

Location Based Services deployed in a mobile station may typically use as default reporting parameters a time or distance-based reporting (TDR) algorithm. In this type of implementation, the mobile station reports its calculated position either after the passing of a predetermined time interval (e.g. one minute, two minutes, etc.) or after the mobile station moves a predetermined distance (one mile, two miles, etc.). While a TDR based reporting system works generally well for loosely-tracked vehicles, assets, handsets, and the like, using fixed TDR reporting parameters maybe unsatisfactory for some Location Based Services. As an example, when supporting a Location Based Services application for position tracking, a mobile station location history can be used to show the positions of where turns were made along the track taken.

Consider an example environment in a city with a "grid" roadway system, where all the east-west and north-south streets are constructed in substantially a parallel grid. The mobile station may be initially configured to report a location fix each minute or mile, based on a default TDR reporting parameters. The plotted mobile station positions would likely be accurate as to history if the mobile station remained on a particular roadway segment.

If the mobile station deviates substantially from a continuous roadway segment, such as by making a turn off into a residential street, turning onto an arterial roadway, taking a detour, etc., the true position of the mobile station would not be recognized until the next pre-planned reporting interval or time or distance has elapsed. A mobile station with dynamic reporting parameters can augment, modify, or supplant one or both of the default time and distance reporting parameters with additional parameters.

The reporting parameters can include, for example, time, distance, course, velocity, and the like, and combinations thereof. The reporting parameters may be interrelated or independent and may be static or dynamic.

As an example, an intelligent dynamic reporting scheme includes course as a reporting parameter. The mobile station examines the course of the mobile station, as determined from current and past location fixes, and recognizes when the mobile stations' track over the ground has performed a turn. In one embodiment, the mobile station may determine a change in course by measuring the amount of track change relative to the last several position fixes. The mobile station can determine that a configurable turn angle threshold is passed, and in response, the mobile station can generate and transmit a position report. The mobile station may then reset or otherwise adjust parameters associated with other reporting parameters. For example, the mobile station may reset the reference time and reference location associated with the TDR parameters.

FIG. 1 is a simplified functional diagram of an embodiment of a mobile station 110 in an operating environment 100. The mobile station 110 is illustrated as following a route 120 to a destination 130. The route 120 may be, but need not be, a predetermined path. For example, where the mobile station 110 implements a navigation unit, a starting location and destination may be entered into the mobile station 110, and the mobile station 110 may generate the predetermined route 120. Alternatively, the mobile station 110 may not utilize knowledge of the route 120, and instead, may operate to trace the path traveled by the mobile station 110, with no knowledge of either the destination 130 or a predetermined route 120.

Although the operating environment 100 is illustrated as having a collection of roadways, the dynamic reporting methods and apparatus described herein are not limited to use along roadways or in vehicles. The dynamic reporting methods and apparatus are also suitable for use in environments devoid of roadways. For example, a personal mobile device carried by a pedestrian may implement and utilize the dynamic reporting methods and apparatus.

The mobile station 110 may traverse any number of streets or pathways along the route 120 to the destination 130. The route 120 may include, for example, highways 160-1, arterial roads 160-2, as well as residential streets 160-3. The speed of the mobile station 110 as well as the abruptness of turns, also referred to as changes in track, may vary based on the type of road being traversed.

As an example, the mobile station 110 traversing the route 120 to arrive at the destination 130 may initially be travelling on a first portion 122-1 of the route 120 corresponding to a highway 160-1 portion. The velocity of the mobile station 110 along the first portion 122-1 may be relatively high, such as around 100-150 kph. The mobile station 110 is unlikely to encounter abrupt turns or changes in track while traversing the highway 160-1.

The mobile station 110 may exit the highway 160-1 and turn onto an arterial road 160-2. The route 120 includes a turn 124-1 that traces the path of the mobile station 110 from the highway 160-1 to the arterial road 160-2. The velocity of the mobile station 110 on the arterial road 160-2 may vary substantially, but typically does not exceed the velocity encountered on the highway 160-1. The velocity may in some instances decrease to zero when the mobile station 110 encounters a traffic signal.

The mobile station 110 may proceed on the arterial road 160-2 until it executes another turn 124-2 on the route 120 that transitions to the mobile station 110 to a residential street 160-3 or some other access road. The mobile station 110 may execute any number of additional turns 124-3 in the route before arriving at the destination 130.

Furthermore, the mobile station 110 may encounter any number of altitudes while traversing the route to the destination. For example, the mobile station 110 may encounter multiple level roadways, multiple level parking structures or multiple level destinations, such as with multi-level airport departure and arrival terminals.

While FIG. 1 illustrates a particular route 120 traversed by the mobile station 110, it is clear that the mobile station 110 may arrive at the destination 130 by traversing any number of alternate routes.

The mobile station 110 may be position location capable and may generate or otherwise determine its location according to a position update rate. The position update rate may be based on, for example, a particular position location technique utilized by the mobile station, position location hardware implementation, position location algorithms, and the like, or some combination thereof. For example, the mobile station 110 may support mobile-based assisted GPS as one position location technique as a position location solution. The mobile station 110 can be configured to generate a GPS position fix based in part on a sampling and integration time implemented in determining the position fix. The mobile station 110 may also implement Advanced Forward Link Trilateration (AFLT) or one or more other position location techniques to determine its position.

The mobile station 110 can be configured to log or otherwise store all or a subset of the position fixes determined by the one or more position location implementations. The mobile station 110 can implement, for example, one or more logging parameters to control logging of the position fixes.

The mobile station 110 may also report all or a subset of the position fixes to a remote entity. For example, the mobile station 110 can be configured to report position fixes to a central registry 150 via one or more wireless access points. In the operating environment 100 example illustrated in FIG. 1, the mobile station 110 can report position fixes via one or more base stations 140-1 and 140-$n$ that are part of a wireless communication system, such as a cellular communication system. A base station, for example 140-1, may serve as a wireless access point that ultimately connects the mobile station 110 to the central registry 150.

The mobile station 110 may utilize one or more reporting parameters to determine whether to report a position fix. The reporting parameters and the reporting process can be independent or related to the logging process performed local to the mobile station 110.

The central registry 150 may serve as a repository of position fixes or may service one or more Location Based Services. The Location Based Services may be hosted local to the central registry 150 or may be hosted remotely from the central registry 150. In embodiments where the Location Based Services are hosted remote from the central registry 150, a communication link may provide the Location Based Service with access to the position fixes in the central registry 150.

In one example, the central registry 150 may be associated with a central dispatch agency for emergency services, transportation services, and the like. The mobile station 110 may be local to an emergency vehicle, and may report its position to the central registry 150 when the vehicle is dispatched in response to an emergency call. In another example, the central registry 150 may be local to a taxi dispatch center and a mobile station 110 may be local to each taxi. The mobile station 110 may report the position fixes for its corresponding taxi, either continuously, following dispatch, or when a fare is active.

In another embodiment, the central registry 150 can operate as or in conjunction with an information server for Location Based Services. Location Based Services that are authorized to access the central registry 150 can utilize the various reported location fixes in support of the services. For example, a mobile station 110 may be a wireless telephone that hosts a Location Based Service that provides tracking of peer devices in a predefined group. The mobile station 110 may report its position to the central registry 150, and may access the central registry 150 to determine position fixes for the various peer devices. Similarly, a location based advertisement service may access the position fixes reported to and stored in the central registry 150 to determine the identities of mobile stations 110 to which location aware advertising is pushed.

The Location Based Services examples described herein are provided for the purposes of illustrating the types of services that may be supported. The examples are not intended to be exhaustive, but are merely illustrative of possible alternatives.

The mobile station 110 may be one of numerous mobile stations wirelessly reporting position fixes. The wireless communication system over which the mobile station 110 reports the position fixes is typically a multiple access system, where the wireless resources are shared among many users.

Although the mobile station 110 may conceivably report every position fix, the frequency of reporting may unnecessarily consume wireless resources. However, reporting too few position fixes sacrifices positional accuracy and sacrifices the ability to successfully reconstruct the route 120 traversed by the mobile station 110.

The mobile station 110 utilizes the reporting parameters to control the amount of information transmitted over the wireless link and balance the need for positional accuracy with the need to conserve wireless resources. The reporting parameters can be optimized for each Location Based Service, and can be dynamic and dependent. The reporting parameters can change during support of a particular Location Based Service. Furthermore, interrelating several reporting parameters permits changes in one or more reporting parameters to affect or change dependent reporting parameters.

In an example, the mobile station 110 may initially be configured with time and distance based reporting parameters. The LBS application can be configured to utilize a Time Distance Reporting (TDR) reporting algorithm using elapsed time and distance traversed as the default parameters for reporting positions.

One or more of a time interval or a distance interval can be entered or otherwise selected by a user or operator of the mobile station 110. Alternatively, the reporting algorithm within the mobile station 110 may initialize a default time interval or distance interval as the reporting parameters. The reporting algorithm may also include turns, track changes, or course as an additional reporting parameter.

The mobile station 110 reports position updates to the central registry 150 as the time or distance interval passes. If the mobile station 110 detects a turn, such as turn 124-1, (more precisely, the mobile station 110 determines a change of computed ground track) and such turn exceeds a predetermined angular threshold (e.g., 45 degrees), an immediate position is calculated or otherwise retrieved from storage and transmitted to the central registry 150 or some other monitoring service. The reporting algorithm resets the TDR reporting monitors, and the reporting process begins anew. Thus, the inclusion of the track changes as an additional reporting parameter ensures the position is reported to the central registry 150 when a relevant positioning event occurs, regardless of the time interval or distance traversed since the last reporting event.

Other reporting parameters can be included and used to trigger other reporting events. Additionally, one or more reporting parameters can be used to dynamically modify the values of one or more of the other reporting parameters in addition to or as an alternative to operating as a trigger mechanism for reporting events.

As an example, the velocity of the mobile station 110 may be a reporting parameter. In one embodiment, one or more velocity thresholds may be used as triggers for reporting the position of the mobile station 110. In another embodiment, the one or more velocity thresholds may be used to modify the values of another reporting parameter. For example, mobile station velocity can be used to modify the thresholds used in time or distance reporting. Velocity can be either positively or negatively correlated with time and distance reporting parameters. Low velocity may trigger decreased time reporting intervals and decreased distance reporting intervals. Alternatively, low velocity may trigger increased time reporting intervals and increased distance reporting intervals.

The manner in which one reporting parameter, e.g. velocity, affects another reporting parameter, e.g. time, may be related to the LBS with which the reporting parameters are associated. For example, in a vehicle tracking scenario, a relative high velocity may be associated with highway travel, and time and distance intervals may be increased without much loss in positional detail. However, in a pedestrian tracking or peer location scenario, a relative high velocity may make decreased time and distance intervals desirable.

Figure 2A:
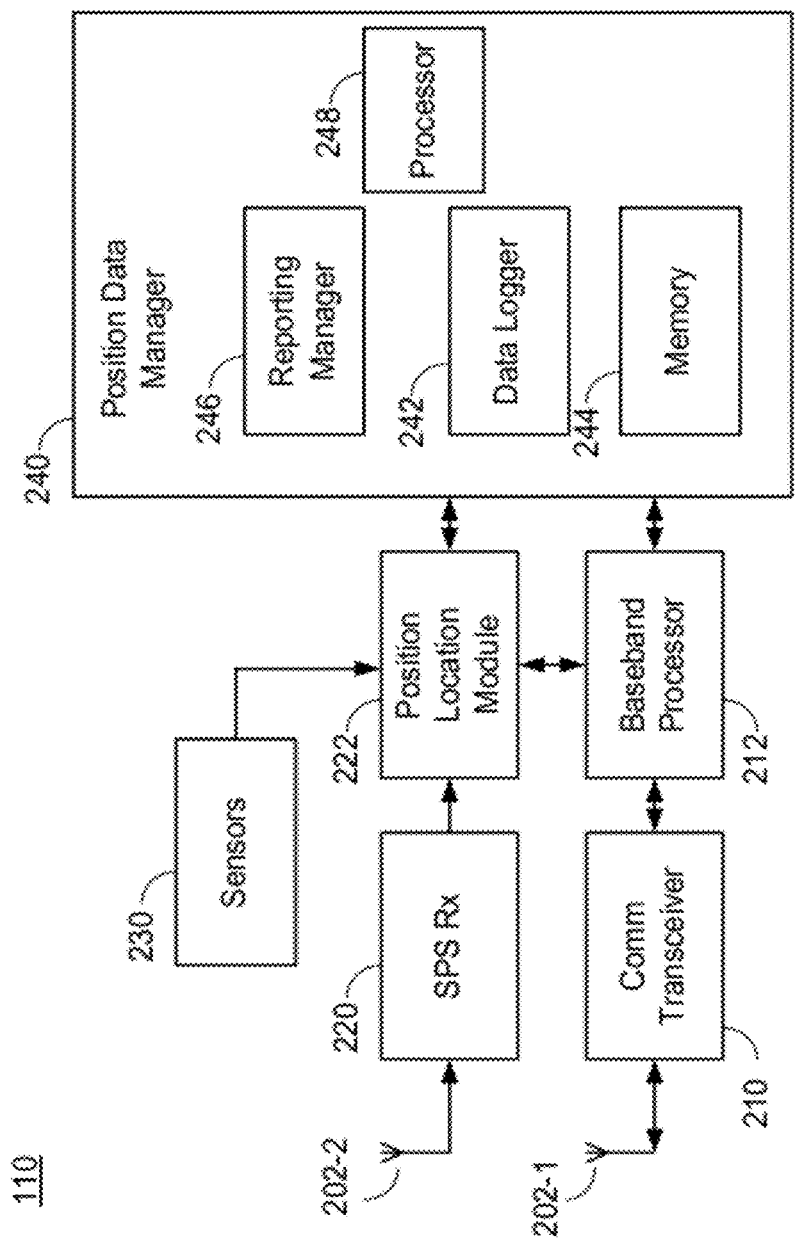
FIG. 2A is a simplified functional block diagram of an embodiment of a mobile station.

FIG. 2A is a simplified functional block diagram of an embodiment of a mobile station 110 configured for dynamic position reporting. The mobile station 110 can be, for example, the mobile station illustrated in the operating environment of FIG. 1.

The mobile station 110 of FIG. 2A is configured to support positioning based on signals from a Satellite Positioning System (SPS) and is configured to support wireless communications. The mobile station 110 can be, for example, a location-enabled cellular telephone.

The mobile station 110 includes a communication signal processing path and a positioning signal processing path. The mobile station 110 may also utilize communication signals for positioning, such as in AFLT or hybrid GPS positioning. However, for purposes of clarity and brevity, the description is limited to SPS positioning.

The communication signal processing path includes a communication antenna 202-1 coupled to a communication transceiver 210. The communication transceiver 210 is coupled to a baseband processor 212. The baseband processor 212 is coupled to a position data manager 240.

The communication transceiver 210 is configured to receive downlink data and information over a wireless communication downlink as well as transmit uplink information and data across a wireless uplink. The downlink information can include, for example, positioning requests or location based services requests, responses, or some other information. Similarly, the uplink data and information can include locally generated location based services requests, responses, as well as position data.

The baseband processor 212 is configured to process the downlink signals and route them to the position data manager 240, where appropriate. The baseband processor 212 can also receive information from the position data manager 240 and process it for transmission by the communication transceiver 210.

The positioning signal processing path includes a positioning antenna 202-2 coupled to an SPS receiver 220. The output of the SPS receiver 220 is coupled to a position location module 222. The output of the position location module 222 is coupled to the position data manager 240.

The SPS receiver 220 can be, for example, a GPS receiver and can be configured to receive signals from a plurality of GPS satellites and determine pseudoranges to each of the plurality of satellite vehicles. The position location module 222 can be configured, in a mobile-based location capable mobile station 110, to determine the geographic position, referred to as a position fix, of the mobile station 110 based on the pseudoranges. Alternatively, the position location module 222 can be configured to communicate the pseudorange information to a positioning entity, such a Position Determination Entity (PDE) when the mobile station 110 is configured to perform mobile-assisted positioning. The position location module 222 in a mobile assisted implementation can be configured to communicate the pseudorange information to the baseband processor 212 for communication to a remote positioning entity.

Additionally, the position location module 222 can receive position assistance information from the baseband processor 212. For example, a serving base station may communicate position assistance information the mobile station 110 via the communication transceiver 210. The baseband processor 212 can extract the position assistance information and communicate it to the position location module 222. The position location module 222 can utilize the position assistance information when determining the position fix or can communicate some of the position assistance information to the SPS receiver 220 to assist the SPS receiver 220 in processing received satellite signals.

The mobile station 110 can also include one or more sensors 230 that can be used in determining or assisting in the determination of the position of the mobile station. The sensors 230 can include, for example, a magnetometer, an accelerometer, an altitude sensor, and the like. The mobile station 110 can utilize one or more sensor values to augment or determine the position fix. For example, the position location module 222 can perform some form of dead reckoning to update a position of the mobile station 110 relative to a reference location. The position location module 222 can integrate accelerometer readings to determine a velocity or position offset.

The position location module 222 couples the position fixes, representing the location of the mobile station 110, to the position data manager 240. The rate at which the position location module 222 updates position fixes may be determined based on several position processing parameters, which can include coherent and non-coherent integration times, sampling periods, and the like or some combination thereof. In one embodiment, the position location module 222 can be configured to communicate all position fixes to the position data manager 240. In other embodiments, the position location module 222 can be configured to communicate a subset of all position fixes to the position data manager 240. The position data manager 240 may control the rate at which position updates are communicated by the position location module 222.

The position data manager 240 can include a data logger 242, memory 244, and reporting manager 246. The data logger 242 can be configured to receive the position location fixes from the position location module 222 and can selectively log the information to memory 244 based on one or more logging parameters.

The logging parameters may be associated with particular Location Based Services applications or may be default values that are independent of LBS applications. In other embodiments, the logging parameters may be associated with particular LBS applications, but may also depend on parameters specific to the mobile station 110. Such parameters local to the mobile station 110 can include, for example, available memory 244.

At the upper extreme, the data logger 242 selects every position fix for storage in the memory 244. At the lowest extreme, the data logger 242 selects no position fixes for storage in memory 244. Most typically, the data logger 242 selects some subset of position fixes for storage in memory 244.

The data logger 242 can write the position fixes and an associated time stamp to fixed locations in memory 244. Alternatively, the data logger 242 can write the position fixes and an associated time stamp to memory 244 to locations that are indirectly identified, for example by a pointer. In another example, the data logger 242 can write the position fixes and an associated time stamp to a location in a stack, and the locations may vary based on an amount of storage already consumed in the stack. In yet another embodiment, the memory 244 may be configured as a circular buffer and the data logger 242 can write the position fixes and an associated time stamp to the next available location in the circular buffer. Other memory 244 configurations may be used, and the process of logging position fixes is not limited to any particular memory configuration.

The reporting manager 246 can manage and control reporting of the position fixes based on a set of reporting parameters. The reporting manager 246 can receive the position fixes from the position location module 222 or can operate on the position fixes stored in memory 244 by the data logger 242.

The reporting manager 246 may also store one or more position fixes into memory 244 or may tag, mark, or otherwise identify one or more position fixes stored in memory. Alternatively, the reporting manager 246 may store data or information in memory 244 derived from the one or more position fixes.

The reporting parameters may include, for example, time, distance, and track changes. Each of the reporting parameters can include one or more thresholds that are used by the reporting manager 246 to determine whether to initiate position reporting. The reporting manager 246 may determine a most recent time that a position was reported as a reference time. The reporting manager 246 may determine, based on the reference time and an elapsed timer that may be internal to the reporting manager 246, whether to report a position update. Similarly, the reporting manager 246 may determine a location of the mobile station 110 at the last position update as a reference position. The reporting manager 246 may compare the latest position fix to the reference position to determine whether a distance threshold of the reporting parameters has been surpassed. If so, the reporting manager 246 initiates position reporting. The reporting manager 246 can also determine a course or track based on two or more position fixes or in combination with one or more sensor readings. The reporting manager 246 can store a reference course or reference direction for use with a track change or turn reporting parameter.

The reporting parameters can also include one or more relational reporting parameters, where a relational reporting parameter refers to a parameter that has an affect on at least one other reporting parameter, referred to as a dependent or associated reporting parameter. As discussed earlier, a relational parameter can include mobile station velocity. A threshold value for a relational reporting parameter may be a trigger point for a reporting event. The threshold may also be a trigger for modification of the one or more reporting parameters affected by or otherwise associated with the relational reporting parameter.

In an embodiment, 'velocity' may be a relational reporting parameter, and there may be several velocity thresholds. The reporting parameters of 'time' and 'distance' may be associated with the 'velocity' relational reporting parameter. Each threshold of the 'velocity' relational reporting parameter may be associated with a corresponding change to a threshold in one or more of the 'time' or 'distance' reporting parameters.

As an example, suppose that the 'velocity' relational reporting parameter has 100 kph as a threshold. When the mobile station velocity is below 100 kph, the 'time' and 'distance' thresholds may be at first thresholds. When the velocity of the mobile station exceeds 100 kph, the reporting manager 246 may modify the 'time' and 'distance' thresholds to second thresholds, that are distinct from the first thresholds. The first 'time' threshold can be one minute, while the second 'time' threshold can be 30 seconds. The first 'distance' threshold can be 1 km while the second 'distance' threshold can be 0.5 km. The 'velocity' relational reporting parameter can also be related to a 'course' or 'track' reporting parameter. The reporting threshold for the deviation in course can change from a first threshold, such as 45 degrees, to a second threshold, such as 20 degrees, based on the velocity. Of course, the reporting thresholds need not be positively correlated to the relational threshold.

The reporting manager 246 can initiate position reporting of a report type that is based on the various reporting parameters. In one embodiment, the reporting manager 246 can send a single most recent position fix upon initiating position reporting. Alternatively, the reporting manager 246 can initiate different types of position reporting based on the reporting parameter that initiated position reporting.

In one embodiment, the reporting manager 246 can selectively determine whether to send a report type that reports redundant position fixes, sequential position fixes, single position fixes, and associated data based on the reporting parameter that initiated the reporting event. The reporting manager 246 can also selectively determine whether to push the position fix or to require an affirmative acknowledgment, ACK, based in part on the reporting parameter that initiated position reporting. The type of reporting may be dependent or independent of the LBS application that is being serviced, and may be dependent or independent of reporting characteristics.

As an example, the reporting manager 246 can merely send a single position report and associated time stamp without requiring an ACK when the report is initiated based on a time or distance reporting parameter. The reporting manager 246 can send redundant position reports or can report two or more sequential position fixes if the position reporting is triggered by a turn. The reporting manager 246 can send a single position fix and request an ACK for other reporting parameters.

The report type initiated by the reporting manager 246 can depend on one or more report characteristics that can include, for example, a probability of receipt, resource load, a ranking of criticality of information, wireless channel conditions, and the like, or some combination thereof. The reporting manager 246 may monitor one or more report characteristics and dynamically modify the report type based on the report characteristics.

The reporting manager 246 can reset the references used by the reporting parameters once a position report is transmitted or acknowledged, regardless of the reporting parameter that initiated position reporting. For example, a position report initiated for a turn may cause the reporting manager 246 to update and reset the timer and reference position used in time and distance reporting.

The position data manager 240 can also include a processor 248 that is shared among the reporting manager 246 and the data logger 242 for performing one or more of the functions associated with the reporting manager 246 and the data logger 242. For example, the processor 248 can be configured to execute instructions encoded in memory 244 for performing some or all of the functions of the reporting manager 246 or data logger 242.

In one embodiment, the reporting manager 246 is implemented as hardware, software encoded on memory and executed by the processor 248 or some combination thereof. The reporting manager 246 can include, for example, a device for accessing memory, such as a Direct Memory Access (DMA) controller, and can include one or more registers, memory, or buffers for storing the reference values, reporting parameter thresholds, and the like. The reporting manager 246 may also include a clock or timer and one or more comparators associated with the registers or memory for comparing or otherwise processing the position fixes to determine the status of the one or more reporting parameters.

The data logger 242 can similarly be implemented as hardware, software encoded on memory and executed by the processor 248 or some combination thereof. The data logger may be as simple as a DMA controller, or can be DMA controller in combination with a clock or timer, one or more comparators, or other hardware to determine that logging parameters have been satisfied.

By dynamically varying reporting parameters, type of report, or a combination thereof, the mobile station 110 may intelligently manage reporting, such that the information relayed to the central registry provides a good indication of a route traversed, while managing a load placed on a wireless communication system.

Figure 2B:
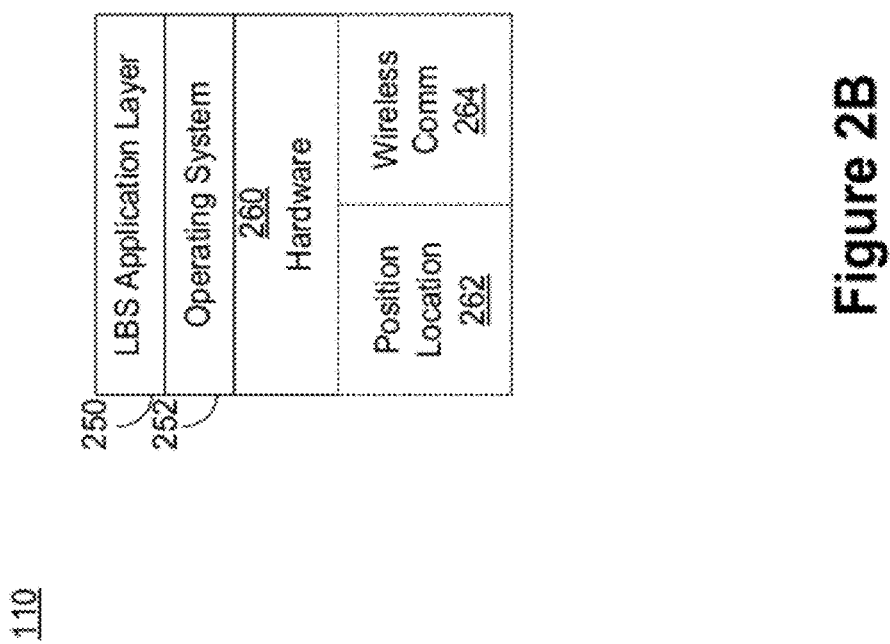
FIG. 2B is a simplified block diagram of a layered model of location based services in a mobile station.

FIG. 2B is a simplified block diagram of a layered model of location based services application 250 in a mobile station 110. The block diagram of FIG. 2B can be an alternative representation of the mobile station illustrated in FIG. 1 or 2A.

The mobile station 110 includes a location based services application 250 operating on top of an operating system. The operating system may be virtually any type of operating system implemented within a mobile station 110. For example, the operating system can be based on a Binary Run Time Environment for Wireless (BREW) operating system, a JAVA operating system, and the like, or some proprietary operating system.

The operating system operates on top of a hardware layer 260. The hardware layer 260 can include, for example, the position location hardware 262 as well as the wireless communication hardware 264.

The elements of the position data manager of FIG. 2A can be embodied in the location based services application 250, the position location hardware 262, wireless communication hardware 264, or some combination thereof.

In one example, a mobile station 110, such as a wireless handset, can be implemented as a BREW handset with GPS/LBS capabilities. The mobile station 110 can include a position reporting software application loaded as a LBS application 250 on the handset. The application can be configured to transmit the handset positions to a monitoring service over a TCP/IP data connection via a cellular network. These positions can be displayed remotely via web or other direct access to the monitoring service.

Figure 3:
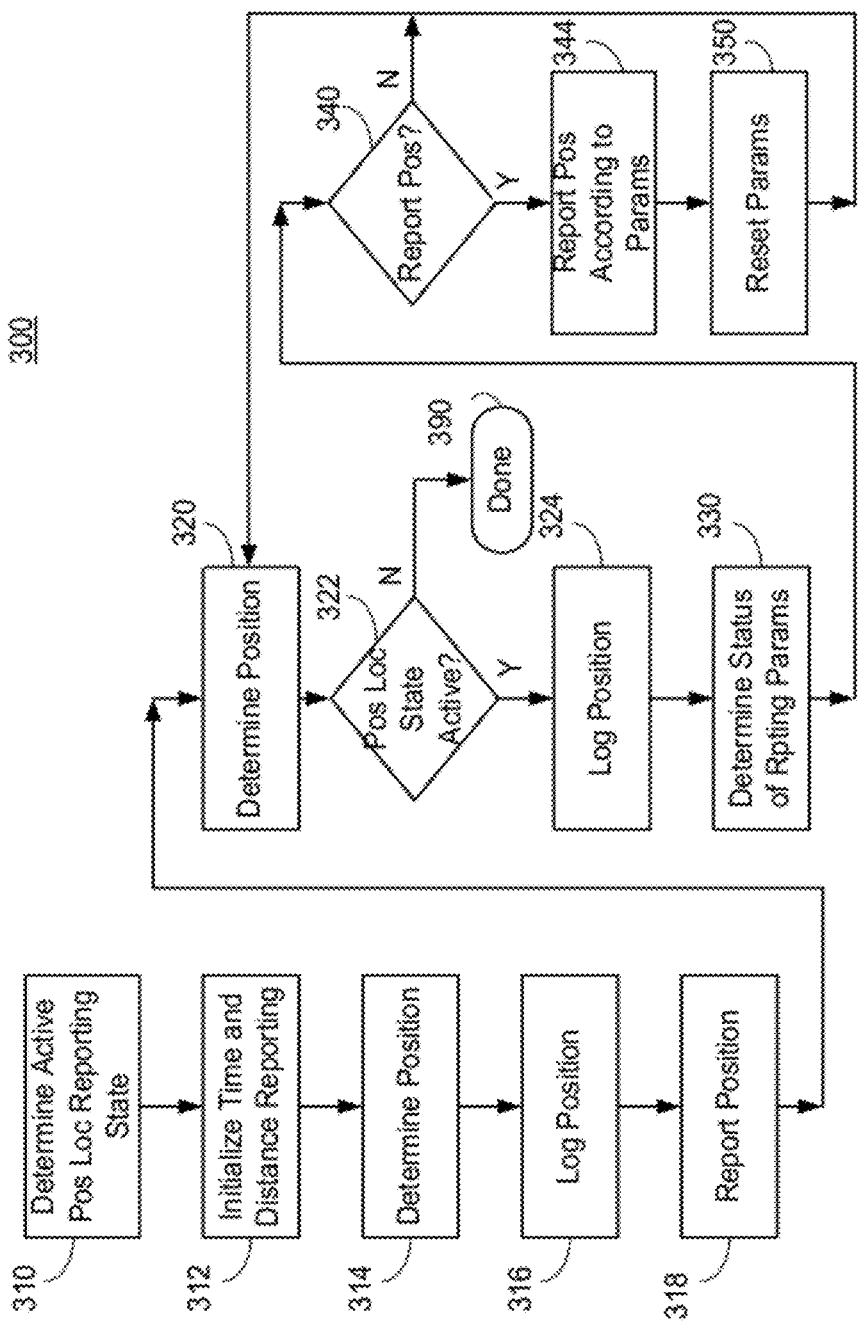
FIG. 3 is a simplified flowchart of an embodiment of a method of dynamic reporting.

FIG. 3 is a simplified flowchart of an embodiment of a method 300 of dynamic reporting. The method 300 can be implemented, for example, on a mobile station of FIG. 1 or FIGS. 2A-2B.

The method 300 begins at block 310, where the mobile station determines transition to an active position location reporting state. The mobile station may transition to an active position location reporting state, for example, upon initiation of a LBS application.

The mobile station proceeds to block 312 and initializes default reporting parameters. Default reporting parameters can include, for example, default time and distance reporting parameters. The mobile station may optionally initialize default logging parameters as well. In the embodiment illustrated in FIG. 3, the mobile station logs every position fix, and thus, initialization of logging parameters is omitted.

The mobile station proceeds to block 314 where the mobile station determines it position. The mobile station can determine its position using, for example, SPS position location AFLT, sensors, and the like or some combination thereof. The mobile station may use mobile based or mobile-assisted position techniques.

After determining its position, the mobile station proceeds to block 316 and logs the position. In one embodiment, a logging manager receives the position fix and stores it into memory along with a time stamp.

The mobile station proceeds to block 318 and reports the position fix. In the embodiment of FIG. 3, the reporting manager operates to report the initial position fix. In other embodiments, the reporting manager may utilize some reporting parameters to determine whether to report the initial position fix. The reporting manager also may initialize or otherwise initialize reference values for reporting parameters. The reference values can include, for example, a reference time of the initial position fix and a reference location. The reference location can be used, for example, to determine distance traversed, velocity, course, and the like.

The mobile station proceeds to block 320 and updates the position fix. The rate at which the mobile station updates the position fix may be determined by an underlying position location application, layer, or hardware, which may operate independent of a LBS application.

The mobile station proceeds to decision block 322 and the mobile station determines if the position location state is still active. In one embodiment, the LBS application determines if the state is still active. In another embodiment, the logging manager can determine if the position location state is still active.

If the position location state is no longer active, such as if the LBS application terminates, the mobile station proceeds to block 390, where the logging and reporting process is done. If, at decision block 322, the mobile station determines that the position location state is still active, the mobile station proceeds to block 324 and logs the updated position.

The mobile station proceeds to block 330 and determines the status of one or more reporting parameters. The reporting manager may access one or more reporting parameters and determine if one or more of the reporting parameters are satisfied.

The mobile station proceeds to decision block 340 and determines, based on the status of the reporting parameters, whether to initiate a report. If the reporting parameters are not satisfied, the mobile station proceeds from decision block 340 back to block 320 to again update the position.

If, at decision block 340 the mobile station determines that at least one of the reporting parameters is satisfied, that is, the mobile station determines, based on the status of the reporting parameters, to initiate a report, the mobile station proceeds to block 344.

At block 344, the mobile station, via the reporting manager, generates and reports the position. The reporting manager may generate a type of report based on the status of the one or more reporting parameters. For example, the reporting manager may determine whether to generate a single position fix report, a redundant position fix report, a series of position fixes as a report, a position report requiring an acknowledgement, and the like.

After reporting the position, the mobile station proceeds to block 350 and resets or modifies the reporting parameters according to the status of the reporting parameters used to initiate the report. For example, the reporting manager may reset a time or distance reference value upon sending a report. The mobile station then returns to block 320 to update the position fix.

Figure 4:
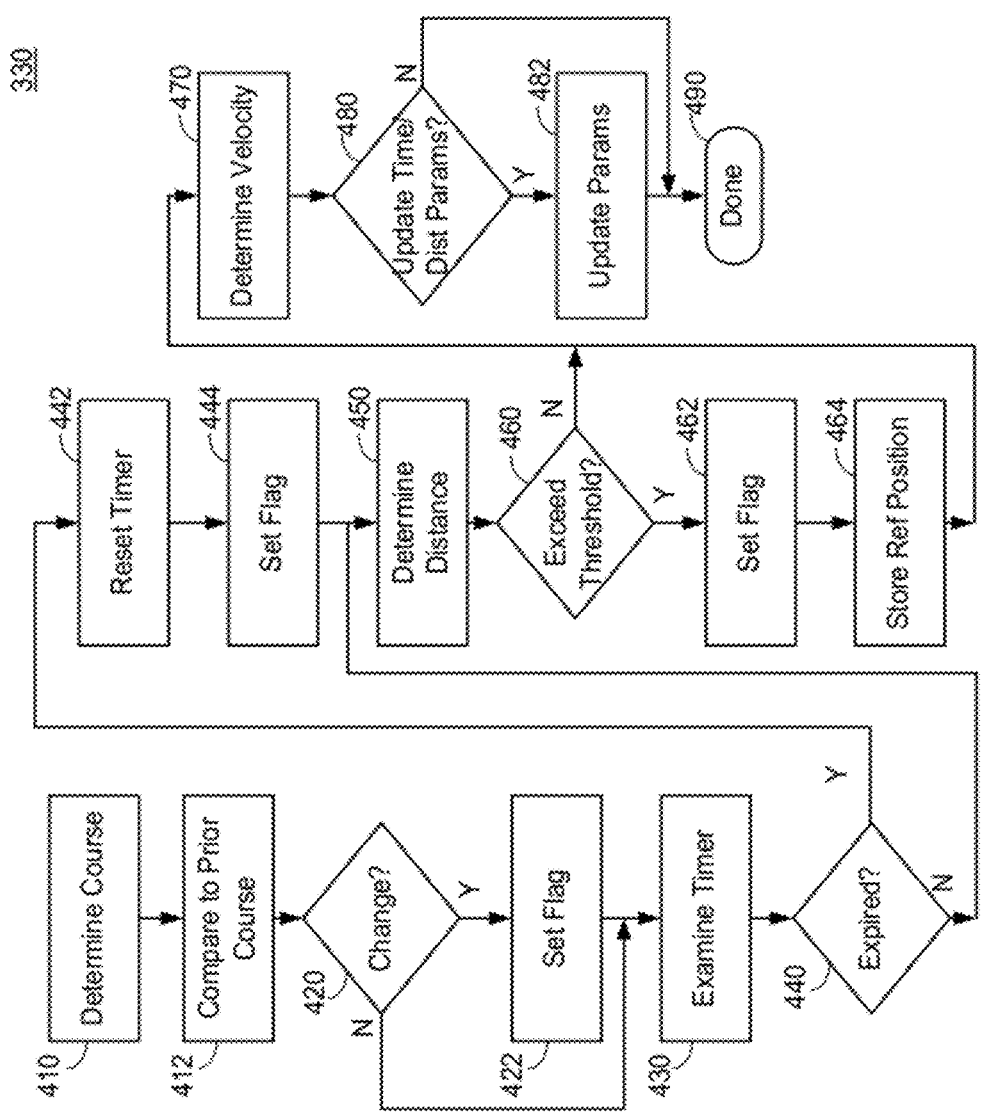
FIG. 4 is a simplified flowchart of an embodiment of a method of determining dynamic reporting parameters.

FIG. 4 is a simplified flowchart of an embodiment of a method 330 of determining status of dynamic reporting parameters. The method 330 may be performed by the mobile station, and in particular a reporting manager of a mobile station, when executing the method of FIG. 3.

The method 330 begins at block 410 where the reporting manager determines the current course of the mobile station. The reporting manager may determine the current course, for example, by determining a direction based on the most recent position fix and an earlier position fix, such as a reference position fix. In another embodiment, the reporting manager may determine a course from one or more sensors in the mobile station. A sensor may directly determine course in combination with heading, such as with an electronic compass. Alternatively, sensor data may be processed to determine a course. For example, acceleration values may be integrated over time to determine a course change.

The reporting manager proceeds to block 412 and compares the updated course to a prior course, which may be stored as a reference course. The reporting manager proceeds to decision block 420 and determines if the course has changed. The reporting manager can determine a change in course, for example, by comparing a change in course to a threshold associated with a course reporting parameter. A threshold for change in course can be, for example, 20 degrees, 30 degrees, 45 degrees, 50 degrees, 60 degrees, or some other value.

If a change in course is determined to have been satisfied, the reporting manager proceeds to block 422 and sets a flag or otherwise indicates that the course changed. The reporting manager proceeds from block 422 to block 430.

If, at decision block 420, the reporting manager determines that no change in course occurred, the reporting manager can proceed to block 430 and avoid block 422. At block 430, the reporting manager determines values associated with the next reporting parameter.

In the example of FIG. 4, the next reporting parameter is time. At block 430, the reporting manager examines the value of an elapsed timer. Alternatively, the reporting manager may examine an indicator that can be set by an elapsed timer. The value of the timer, or the value at which the timer asserts the indicator, can relate to the time interval threshold associated with time reporting.

The reporting manager proceeds to decision block 440 to determine if the timer has expired or if the indicator is asserted. The reporting manager can, for example, compare a timer value against a reference time and determine if the difference is greater than the time interval threshold associated with the time reporting parameter.

If the timer has expired, the reporting manager proceeds from decision block 440 to block 442 where the reporting manager resets or otherwise reinitializes the time and/or indicator. The reporting manager proceeds to block 444 and sets a flag or indicator associated with the time reporting parameter.

The reporting manager proceeds from block 444 to block 450. If, at decision block 440, the reporting manager determines that the timer is not expired, the reporting manager proceeds to block 450 and bypasses blocks 442 and 444.

At block 450, the reporting manager proceeds to the next reporting parameter, in this example, distance. The reporting manager examines the distance traversed since the last reporting event. The reporting manager can determine distance, for example, by comparing two position fixes. The reporting manager may compare the most recent position fix to a reference position fix to determine a distance between them. Alternatively, the reporting manager may rely on one or more sensors to determine a distance. The reporting manager may determine a velocity and integrate the velocity over time to determine a distance. In other embodiments, the reporting manager may utilize a combination of position fixes and sensor data to determine a distance traversed.

The reporting manager proceeds to decision block 460 to determine if the distance traversed exceeds a distance threshold. If so, the reporting manager proceeds to block 462 and sets a flag or indicator associated with the distance reporting parameter. The reporting manager proceeds to block 464 and resets or otherwise updates a reference position used in determining distance traversed. For example, the reporting manager can set the reference position to the latest position fix. The reporting manager proceeds from block 464 to block 470.

If, at decision block 460, the reporting manager determines that the distance reporting threshold has not been exceeded or otherwise satisfied, the reporting manager proceeds to block 470 and bypasses blocks 462 and 464.

At block 470, the reporting manager examines the status of a relational reporting parameter. As described earlier, a relational reporting parameter may, but need not by itself trigger a reporting event. A relational reporting parameter is associated with one or more other dependent or otherwise associated reporting parameters. Changes in the status of the relational reporting parameter can result in changes to the one or more dependent reporting parameters. The relational reporting parameter can have one or more thresholds. Traversing each threshold may result in a different change to the one or more dependent reporting parameter.

For example, at block 470, the reporting manager examines the velocity of the mobile station. The time and distance reporting parameters can be associated or otherwise dependent on the velocity relational reporting parameter. The reporting manager can determine velocity using position fixes and time, using one or more sensor readings, or using a combination thereof.

The reporting manager proceeds to decision block 480 and determines if the velocity triggers the update of any of the dependent reporting parameters. In decision block 480, the reporting manager determines if the time or distance thresholds should be modified or otherwise updated based on the latest velocity estimate.

If so, the reporting manager proceeds to block 482 and updates the dependent reporting parameters. For example, the reporting manager can set a first time and distance threshold for low velocities, such as under 10 kph. The reporting manager can set second time and distance thresholds for intermediate velocities, such as those between 10 kph and 60 kph. The reporting manager can set third time and distance thresholds for high velocities, such as those above 60 kph. The values and number of thresholds can vary based on the LBS application. For example, a pedestrian tracking application may utilize a first set of thresholds while an emergency vehicle tracking application may utilize a second set of thresholds.

After updating the value of the dependent parameters, the reporting manager proceeds to block 490 and the method 330 is done. Alternatively, if the reporting manager does not determine any need to update the dependent reporting parameters, the reporting manager proceeds to block 490 and the method 330 is done.

Methods and apparatus are described herein for dynamic position reporting. The methods and apparatus provide accurate position reporting while requiring a minimal amount of resources from a wireless communication system. The mobile station can selectively report position fixes to a central registry of a monitoring service to enable the monitoring service to track the location of the mobile station. The methods and apparatus solve the question of "where was the mobile station?" or "which road did they really turn on?" The monitoring service may optionally provide a map-based display. The intelligent dynamic reporting scheme as described herein can be utilized for high-value asset tracking, covert police tracking operations, reconstruction of vehicular motions prior to an accident, etc.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored or otherwise encoded in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof. If implemented in software, the functions may be stored as one or more instructions or code on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method of dynamic position reporting, the method comprising:
   determining at least one position fix of a mobile device;
   determining a status of at least one reporting parameter;
   initiating at least one position report based on the status of the at least one reporting parameter;
   selecting a report type for the at least one position report, wherein the report type constrains the number of position fixes contained in the at least one position report, and wherein selection of the report type is based on the at least one reporting parameter used to initiate the at least one position report;
   generating the at least one position report in accordance with the selected report type; and
   sending the at least one position report to a central registry over a wireless communication link.

2. The method of claim 1 wherein the selected report type requires reporting of redundant position fixes.

3. The method of claim 1 wherein the selected report type requires reporting of sequential position fixes.

4. The method of claim 1 wherein the selected report type requires reporting of a single position fix.

5. The method of claim 1 wherein the selected report type requires a request for acknowledgement (ACK).

6. The method of claim 1, wherein the at least one position report is initiated by detecting an elapsed time/distance since a previous position report, and the report type is selected to require a single position fix without a request for ACK.

7. The method of claim 1, wherein the at least one position report is initiated by detecting that the mobile device has performed a turn, and the report type is selected to require sequential position fixes.

8. The method of claim 1 wherein selection of the report type is further based on probability of receipt.

9. The method of claim 1 wherein selection of the report type is further based on resource load.

10. The method of claim 1 wherein selection of the report type is further based on ranking of criticality of information.

11. The method of claim 1 wherein selection of the report type is further based on wireless channel conditions.

12. A dynamic position reporting apparatus, the apparatus comprising:
    a position location module configured to determine at least one position fix of a mobile device;
    a position data manager coupled to the position location module and configured to initiate at least one position report based on a status of at least one reporting parameter and select a report type for the at least one position report, wherein the report type constrains the number of position fixes contained in the at least one position report, and wherein selection of the report type is based on the at least one reporting parameter used to initiate the at least one position report; and
    a communication transceiver coupled to the position data manager and configured to transmit the at least one position report over a wireless channel to a central registry.

13. The apparatus of claim 12 wherein the selected report type requires reporting of redundant position fixes.

14. The apparatus of claim 12 wherein the selected report type requires reporting of sequential position fixes.

15. The apparatus of claim 12 wherein the selected report type requires reporting of a single position fix.

16. The apparatus of claim 12 wherein the selected report type requires a request for acknowledgement (ACK).

17. The apparatus of claim 12, wherein the at least one position report is initiated by detecting an elapsed time/distance since a previous position report, and the report type is selected to require a single position fix without a request for ACK.

18. The apparatus of claim 12, wherein the at least one position report is initiated by detecting that the mobile device has performed a turn, and the report type is selected to require sequential position fixes.

19. The apparatus of claim 12 wherein selection of the report type is further based on probability of receipt.

20. The apparatus of claim 12 wherein selection of the report type is further based on resource load.

21. The apparatus of claim 12 wherein selection of the report type is further based on ranking of criticality of information.

22. The apparatus of claim 12 wherein selection of the report type is further based on wireless channel conditions.

23. A dynamic position reporting apparatus, the apparatus comprising:
    means for determining at least one position fix of a mobile device;
    means for determining a status of at least one reporting parameter;
    means for initiating at least one position report based on the status of the at least one reporting parameter;
    means for selecting a report type for the at least one position report, wherein the report type constrains the number of position fixes contained in the at least one position report, and wherein selection of the report type is based on the at least one reporting parameter used to initiate the at least one position report;
    means for generating the at least one position report in accordance with the selected report type; and
    means for sending the at least one position report to a central registry over a wireless communication link.

24. The apparatus of claim 23 wherein the selected report type requires reporting of redundant position fixes.

25. The apparatus of claim 23 wherein the selected report type requires reporting of sequential position fixes.

26. The apparatus of claim 23 wherein the selected report type requires reporting of a single position fix.

27. The apparatus of claim 23 wherein the selected report type requires a request for acknowledgement (ACK).

28. The apparatus of claim 23, wherein the at least one position report is initiated by detecting an elapsed time/distance since a previous position report, and the report type is selected to require a single position fix without a request for ACK.

29. The apparatus of claim 23, wherein the at least one position report is initiated by detecting that the mobile device has performed a turn, and the report type is selected to require sequential position fixes.

30. At least one storage device encoded with one or more processor-readable instructions when executed by a processor performs dynamic position reporting, the instructions comprising:
    instructions for determining at least one position fix of a mobile device;

instructions for determining a status of at least one reporting parameter;

instructions for initiating at least one position report based on the status of the at least one reporting parameter;

instructions for selecting a report type for the at least one position report, wherein the report type constrains the number of position fixes contained in the at least one position report, and wherein selection of the report type is based on the at least one reporting parameter used to initiate the at least one position report;

instructions for generating the at least one position report in accordance with the selected report type; and instructions for sending the at least one position report to a central registry over a wireless communication link.

31. The at least one storage device of claim 30, wherein the at least one position report is initiated by detecting an elapsed time/distance since a previous position report, and the report type is selected to require a single position fix without a request for ACK.

32. The at least one storage device of claim 30, wherein the at least one position report is initiated by detecting that the mobile device has performed a turn, and the report type is selected to require sequential position fixes.

* * * * *